United States Patent Office 2,958,552
Patented Nov. 1, 1960

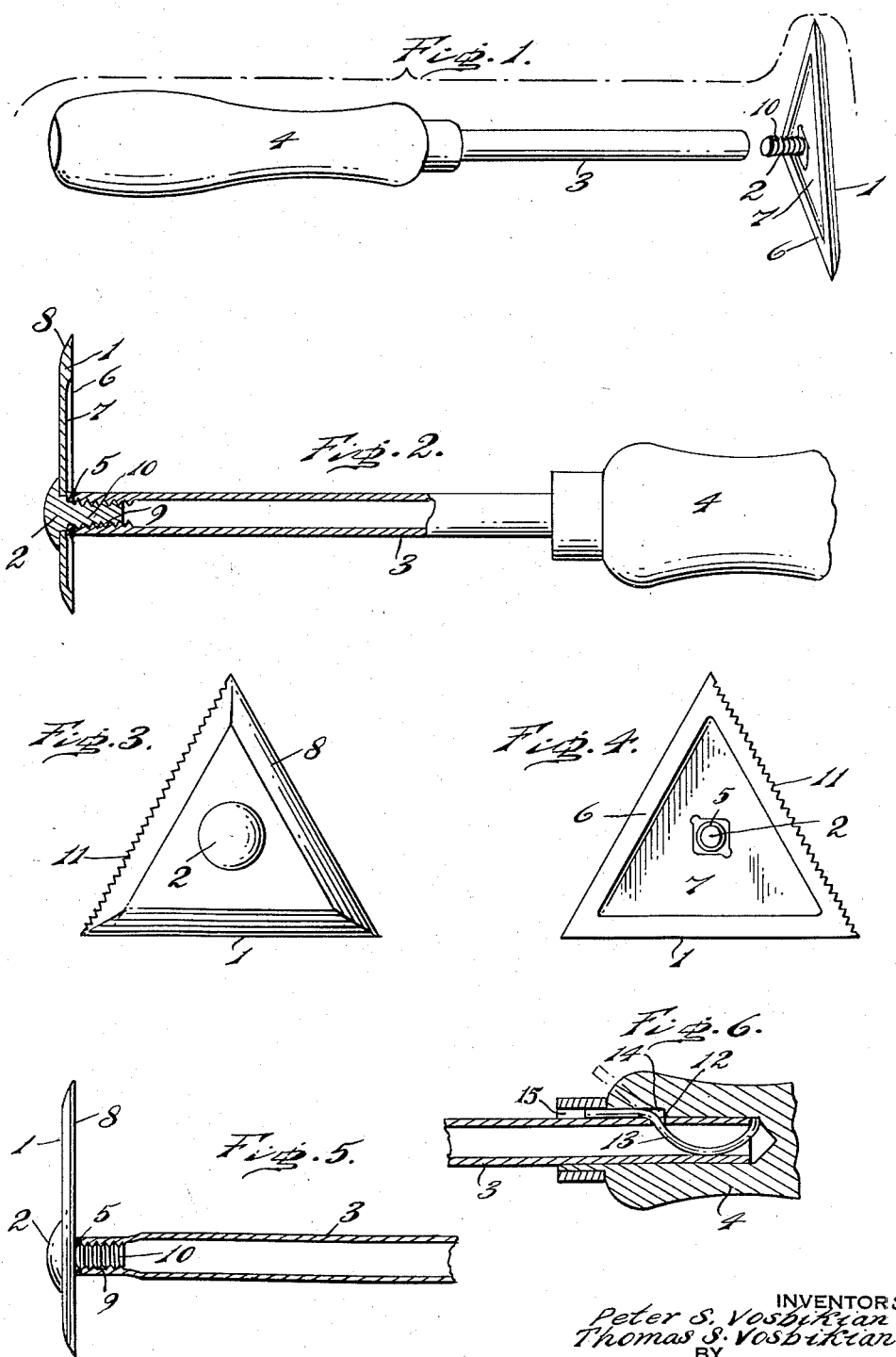

2,958,552

PAINT SCRAPERS

Peter S. Vosbikian and Thomas S. Vosbikian, Melrose, Pa. (Both of 20th and Oxford Sts., Philadelphia, Pa.)

Filed July 14, 1959, Ser. No. 828,430

2 Claims. (Cl. 287—53)

The object of our present invention is to devise a novel scraper wherein the scraper blade has integral with it a bolt which is swaged to the blade, the thread of the bolt being received in a threaded aperture in the inner end of a tubular handle rod, so that the blade is replaceable without the use of a screw driver or other working tool. The shape and contour of the blades vary widely in practice in order to be used in cracks, crevices and places where there is little room for their use. It is ordinarily necessary to have a number of complete blades of different contours. The necessity of a number of complete scrapers to complete a job is overcome by the present invention since the blades may be removed whenever it becomes necessary and replaced by blades of a different shape.

Furthermore, when a job is finished, the workman can remove the blade and place it in his tool box so that the scraping edge or edges will not become dull by contact with other metal tools in his tool box.

A further object of the invention is to provide a marginal flat portion on the inner face of the blade with a depression extending from one scraping edge to another edge so that removed paint will pile up on the flat marginal portion where it can be readily removed.

A further object is to devise novel means to interlock a tubular handle with a shank.

With the foregoing and other objects in view, our invention comprehends a novel paint scraper.

It further comprehends novel means to interlock a handle with a shank of a tool.

For the purpose of illustration, we have shown in the accompanying drawings preferred embodiments of it, which we have found in practice to give satisfactory and reliable results. It is, however, to be understood that the various instrumentalities of which the invention consists can be variously arranged and organized, and the invention is not limited, except by the scope of the appended claims, to the exact arrangement and organization of these instrumentalities as herein shown.

Figure 1 is in perspective an exploded view of the component parts of a paint scraper embodying the invention.

Figure 2 is a side elevation, partly in section.

Figure 3 is a front face view of the blade and bolt.

Figure 4 is a rear view of the blade and bolt.

Figure 5 is a longitudinal section of another form of handle with the blade and its bolt secured to the handle.

Figure 6 is a longitudinal section of a portion of the handle and its grasping portion.

Similar numerals of reference indicate corresponding parts.

Referring to the drawings:

The paint scraper has a scraping blade 1 to which a bolt 2 is permanently fixed, for example by swaging.

The blade has a hole to receive the bolt and the bolt may have a non-circular shoulder inwardly of its head to fit a correspondingly shaped hole in the blade. Thus, the bolt and the blade form a unit of structure which can be sold independently of the entire scraper as a replaceable scraper part.

The bolt is detachably connected with the handle which is in the form of a tubular shank or rod 3 provided with a grasping portion 4, a lock nut 5 being used between the shank and blade if desired.

The blade has a flat, marginal portion 6 on its inner face and is recessed or depressed as at 7. The outer marginal face is bevelled at 8 to contribute with the flat marginal portion 6 to form a desired number of scraping edges.

The outer end of the handle rod 3 is internally threaded at 9 to receive the threaded portion 10 of the bolt.

The outer end of the handle rod may be of reduced diameter as in Figure 5 with a rolled internal thread.

The inner end of the handle shank 3 has an aperture 12 to receive a strip of spring wire 13 of curved formation before assembly with the handle shank so that when the shank is pushed into the grasping portion it will snap over the inner end of the handle shank with the curved bottom portion contacting the bore of the handle shank, and the inner portion of the spring will be pressed into a groove or slot 14 to firmly and permanently lock the handle shank to the grasping portion. A conventional ferrule is on the outer end of the grasping portion, and has a groove 15 aligned with the groove 14.

To replace a blade with a blade of a different shape, the tubular handle is unscrewed from the bolt and a new blade secured in position. Economy in manufacture is obtained by using a tubular rod or shank, and by using a tubular handle and grasping portion for life-time use.

A portion of the scraping edge may be serrated as at 11 and used as a hammer to loosen and remove partly loosened paint.

In this invention, the blade can be removed and wrapped before placing it in the tool box, thus preventing the dulling of the scraping edge by contact with other tools.

The shank is preferably of a thickness that will provide for a slight springing action when the scraper is in use.

Having thus described our invention, what we claim as new and desire to secure by Letters Patent is:

1. Interlocking means for a handle and a shank, comprising a handle having an aperture of uniform diameter opening through its outer end and having a longitudinal groove opening through its outer end and into said aperture, and a shank having a tubular end having a close fit in said aperture and of uniform diameter, said shank having an opening through its side wall communicating with the handle groove, and a normally curved spring extending through said opening, contacting the inner wall of the shank and having its inner end overhanging the inner end of the shank, said spring having a substantially straight stretch compressed in the handle groove and contacting the outer face of the shank.

2. The construction defined in claim 1, wherein a ferrule is on the outer end of the handle and has a longitudinally extending groove opening through its ends and in alignment with the handle groove.

References Cited in the file of this patent

UNITED STATES PATENTS

| 1,414,046 | Rupp | Apr. 25, 1922 |
| 1,815,165 | Scofield | July 21, 1931 |
| 2,472,184 | Anest | June 7, 1949 |
| 2,476,762 | Petre et al. | July 19, 1949 |
| 2,656,210 | Kump | Oct. 20, 1953 |